June 17, 1930.    E. GRANAT    1,764,867
STATIC TRANSMITTER FOR POLYPHASE DISTANT CONTROL SYSTEMS
Filed Oct. 18, 1926    4 Sheets-Sheet 1
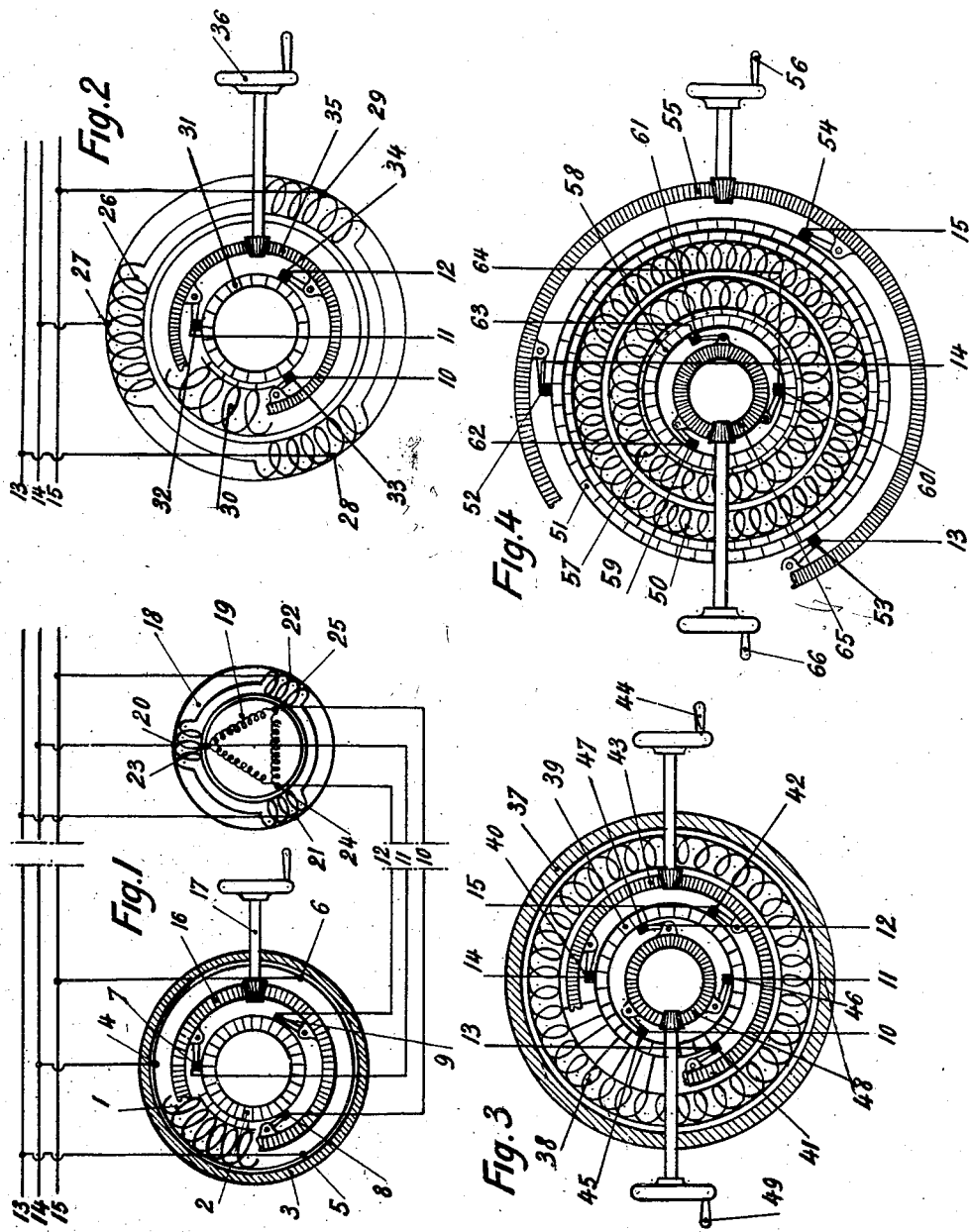
E. Granat
Inventor
By: Marks & Clark
Attys.

E. Granat
inventor

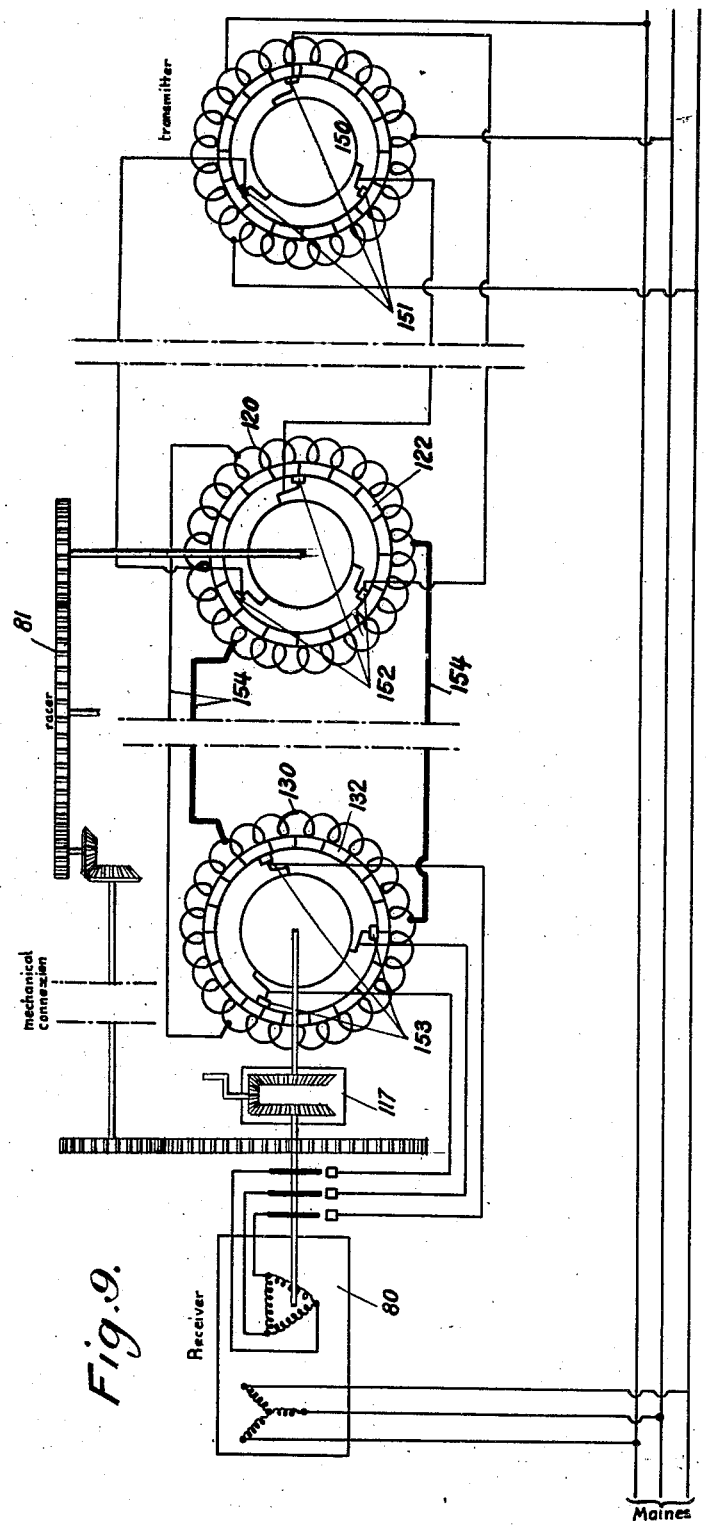

Patented June 17, 1930

1,764,867

UNITED STATES PATENT OFFICE

ELIE GRANAT, OF PARIS, FRANCE, ASSIGNOR OF ONE-HALF TO COMPAGNIE DES FORGES ET ACIERIES DE LA MARINE ET D'HOMECOURT, OF PARIS, FRANCE, A COMPANY OF FRANCE

STATIC TRANSMITTER FOR POLYPHASE DISTANT CONTROL SYSTEMS

Application filed October 18, 1926, Serial No. 142,448, and in France October 31, 1925.

My previous application, Ser. No. 56,380, filed Sept. 14, 1925, and entitled "Polyphase distant control system for differential transmission," describes ordinary differential polyphase distant control systems whereof the transmitter is an electric machine (generator or motor).

The present invention has for its object to provide, according to the same principles, ordinary and differential polyphase and one-phase distant control systems whereof the transmitter comprises one or more stationary windings used either for adding corrections to the movements or signals transmitted by any electric distant control system or for allowing, in such a system, the play arising between the receiver and the part controlled by it to be compensated by the action of a differential control system between the said receiver and controlled part; this latter arrangement allows for instance a gun to be controlled by the electric motor used as a receiver for a distant control system in spite of the angular displacement of the gun whilst firing. The gear between the gun and the receiver would comprise in this case, a friction clutch.

I have described hereinbelow by way of example and shown on appended drawings such arrangements fed with three-phase current. The same could be used with a one-phase feeding current as described in the above-mentioned parent specification. A receiving motor can be provided with as many receiving positions as may be desired, by giving its commutator a suitable number of segments.

Figs. 1 and 2 show distant control systems with ordinary static transmitters, that of Fig. 1 being constituted by one winding and that of Fig. 2 by two windings.

Figs. 3 and 4 show differential static transmitters constituted respectively with one and two windings.

Figure 6:
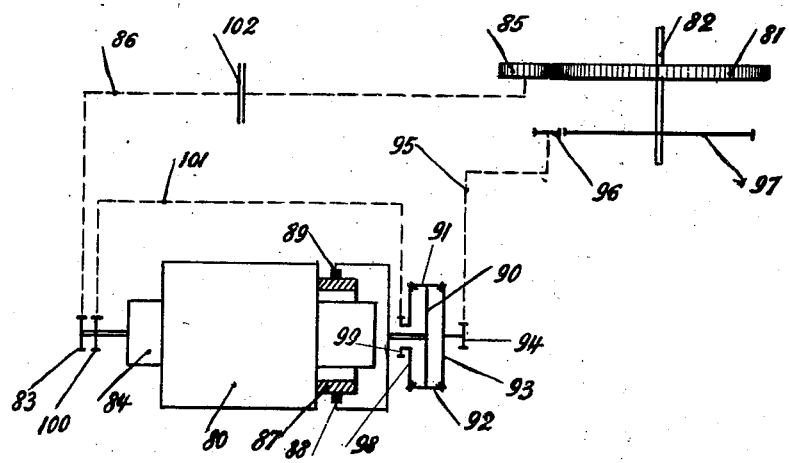
Figure 7:
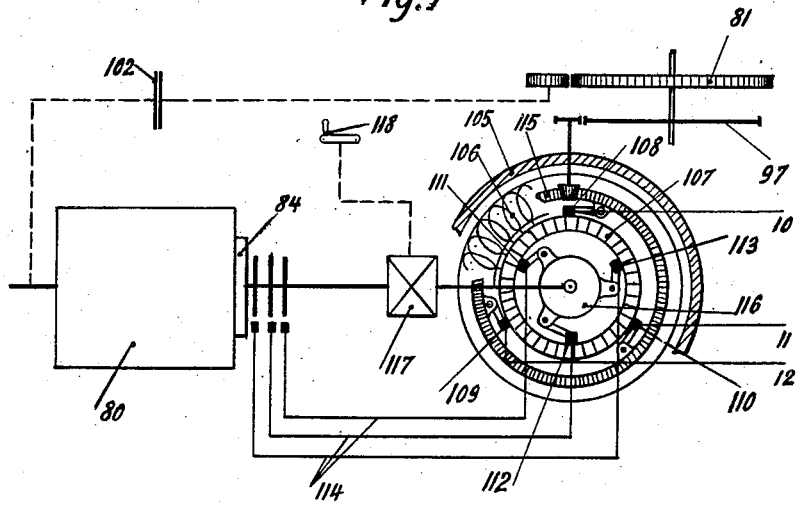
Figure 8:
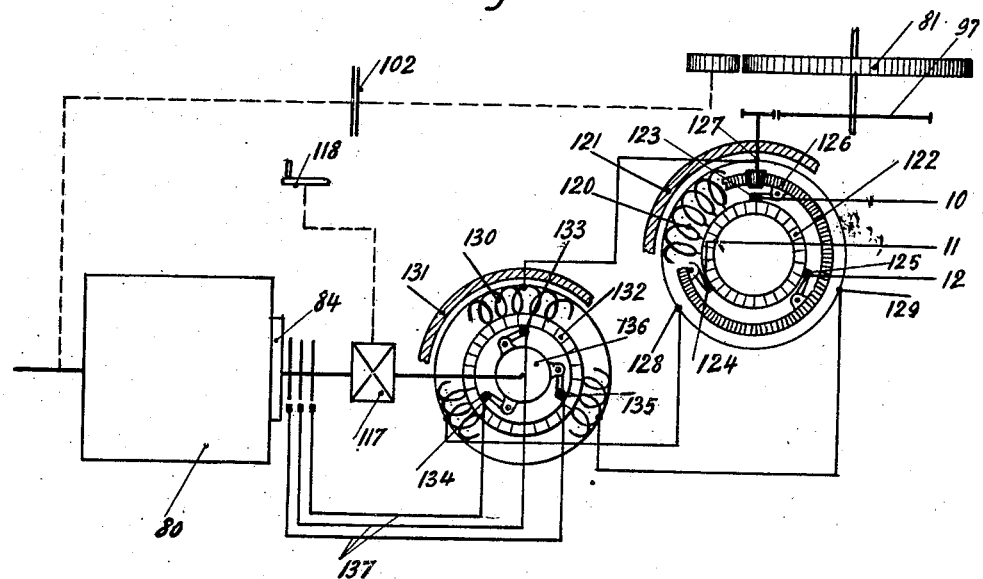

Figs. 6, 7 and 8 show the control system connecting the receiving motor of an electric distant control system and the part it is to control, this control system comprising a mechanical differential (Fig. 6) a static electric differential provided with two movable brush holders (Fig. 7) or a static electric differential comprising two ordinary transmitters placed respectively near the driving motor and near the part to be controlled and connected by transmission wires (Fig. 8).

Fig. 9 shows diagrammatically a complete plant for a distant transmission with correcting devices.

The ordinary electric control system with static transmitters shown on Fig. 1 is constituted as follows:

The static transmitter comprises a winding 1 wound on a magnetic core shown diagrammatically at 3, the elements of this winding being connected with the segments of the commutator 2 and three equidistant terminals of the winding being connected with the wire lines 13, 14, 15 of a three-phase feed system; on the commutator 2 rub three equidistant brushes 7, 8 and 9 which are borne by a movable brush-holder 16 controlled by the handwheel 17. These brushes are connected by means of sliding contacts, not shown, to the transmission wires 10, 11, 12 connecting the transmitter with the receiver.

The receiver comprises a three-phase stator 18 provided with three equidistant terminals 20, 21, 22 fed through the wires 13, 14, 15 of the three-phase feed system. The three-phase rotor 19 is provided with equidistant terminals 23, 24 and 25 on its winding wherethrough it is connected through sliding contacts not shown with the line wires 10, 11, 12.

The device works in the following manner:

The movable brushes remaining stationary in two rotating fields induced in the stator and the rotor of the receiver on one hand through the three-phase feed system 13, 14, 15, and on the other through the wires 10, 11, 12 connected through the brushes 7, 8, 9 with the stationary segments of the commutator 2 of the winding 1 rotate at the same speed. Therefore the rotor of the receiving motor remains stationary. If by actuating the hand wheel 17 the set of movable brushes 7, 8 and 9 is moved over the commutator 2, the phase of the voltage under these brushes will be modified with reference to that of the three-phase feed system 13, 14, 15. Therefore the rotating field of the rotor 19 of the receiver will be shifted with reference to the rotating field of the stator 18. The rotor will rotate by an angle equal to that by which the brushes 7, 8, 9, have rotated whereby the two rotating fields of the receiver will be put back into parallelism so that the movements of the rotor 19 are controlled by those of the hand wheel 17.

The ordinary static transmitter shown on Fig. 2 is a modified form of the one shown on Fig. 1, the difference residing in the provision of two windings instead of one.

It comprises a primary winding 26 connected with the three wires 13, 14, 15, of a three-phase distribution through three equidistant terminals 27, 28, 29. A secondary winding 30 is provided with a commutator 31 on which rub three brushes 32, 33, 34 secured to a movable brush-holder 35 controlled by a hand wheel 36. The three movable brushes 32, 33, 34 are connected through sliding contacts not shown with three wires 10, 11, 12 connecting the transmitter with the receiver. The device works in the same manner as that shown on Fig. 1 with the advantage that by means of the two windings 26 and 30 the voltage in the receiving motor can be brought to a predetermined value.

The differential static transmitter shown on Fig. 3 provided with only one winding is constituted as follows. Round the magnetic core 37 is evenly distributed a winding 38 the different elements of which are connected with the segments of a commutator 39. On this commutator rub two sets of brushes: firstly the three brushes 40—41—42 connected with the three-phase distribution wires 13, 14, 15 and borne by the movable brush-holder 43 controlled by the handwheel 44, secondly the three brushes 45, 46, 47 connected with the three transmission wires 10, 11, 12 and borne by the movable brush-holder 48 controlled by the handwheel 49. This transmitter is connected through the transmission wires 10, 11, 12 to a receiver of the type shown on Fig. 1. It is easy to see that for each rotation of one of the brush sets, the rotor of the receiver will rotate by a corresponding amount.

The static differential transmitter shown on Fig. 4 and provided with two windings is constituted as follows:

A primary distributed winding 50 is provided with a commutator 51 on which rub three brushes 52, 53, 54 connected with the wires 13, 14, 15 of a three-phase distribution. These three brushes 52, 53, 54 are borne by a movable brush-holder 55 controlled by a hand wheel 56. A secondary winding 57 also distributed has its elements connected with a commutator 58 on which rub three brushes 59, 60, 61 connected with the three transmission wires 62, 63, 64. These three brushes 59, 60 61 are borne by a movable brush-holder 65 controlled by a hand wheel 66. For each rotation of one of the handwheels 56 or 66, the rotor of the receiver similar to the one shown on Fig. 1 rotates by a corresponding amount.

These static transmitters can be used with advantage in electric distant control systems of any kind; for instance they can be used in a control system provided with a dynamic transmitter such as the one described in the applicant's previous application Ser. No. 56,380 (patented Feb. 8, 1927, No. 1,616,795) for adding suitable individual corrections at any point of the transmission to the angular movements transmitted.

Figure 5:
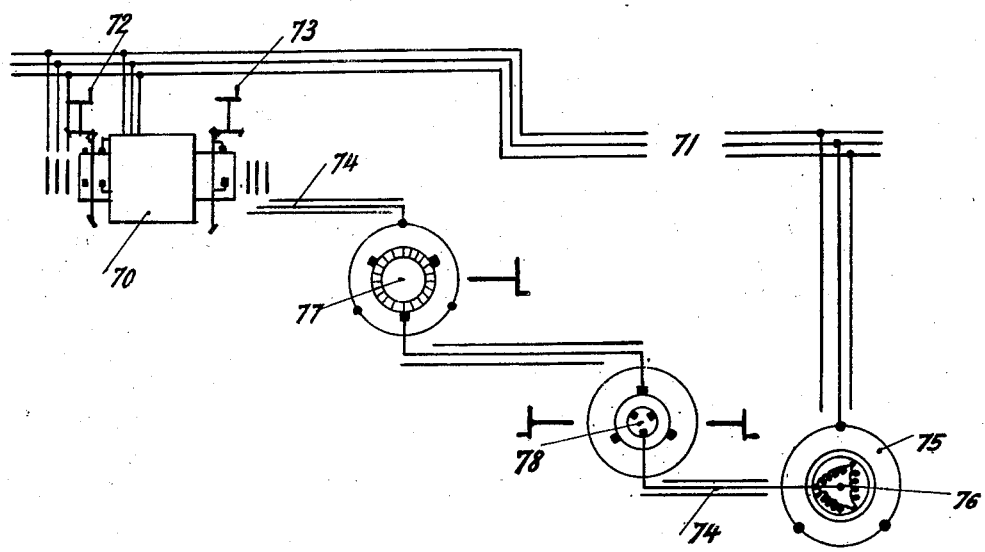
Fig. 5 shows ordinary static transmitters such as those shown on Figs. 1 and 2 used as relays between the transmitter and the receiver of a general distant control system of any type for adding given corrections at any point of the transmission line.

As shown on the diagram of Fig. 5 such an application can be made as follows:

A differential distant control transmitter 70, fed through the three-phase wires 71 is provided for instance with two controlling handwheels 72—73 one of which acts on the position of the set of movable brushes connected with the feed system 71 and the other on the position of the set connected with the transmission wires 74. The transmitter feeds through the said wires 74 the three-phase rotor 76 of a receiver the three-phase stator of which is fed by the mains 71. One or more static transmitters are inserted in the wires 74 of the type shown for instance on Figs. 1, 2, 3 or 4. The wires 74 are connected to the feed side of the static transmitter in the case of only one winding as in Figs. 1 and 3 through three equidistant terminals or three brushes such as 4, 5, 6 (Fig. 1) or 40, 41, 42 (Fig. 3) and in the case of two windings as in Figs. 2 and 4 through three equidistant terminals or three brushes such as 27, 28, 29 or 52, 53, 54 (Fig. 4). The current issuing out of the static transmitter is transmitted through three movable brushes controlled by a handwheel as in the abovedescribed static transmitters.

These arrangements have been diagrammatically shown for an ordinary one-winding transmitter 77 and for a differential two-windings transmitter 78. It is easy to understand that by rotating the hand wheel in 77 or the two handwheels in 78, corrections can be added at intermediary stations to the rotations transmitted from the transmitter 70 to the receiver 76.

The types of static transmitters described hereinabove allow also the execution of an electric distant control receiver wherein the play arising between the rotor of the receiver and the part controlled by it is compensated or wherein the control of the said part is such as will cause its permanent concordance with the receiver if it is connected to it through a sliding part such as a friction clutch.

The principle of this device is shown on Fig. 6.

The receiver 80 of an electric distant control device actuates for instance the racer 81 of a gun adapted to move round the axis 82, through the pinion 83 secured to the shaft of the rotor 84 of the receiver and a pinion 85 meshing with the racer 81. The connection between the pinions 83 and 85 is shown diagrammatically by the dash line 86. The receiver 80 comprises an inducing stator the distributed winding of which has its segments connected with a commutator 87. On this commutator 87 rubs a set of movable brushes 88, 89, serving as terminals for the wires, not shown, feeding the receiver with D. C. or with one phase or polyphase A. C. In view of providing for the accuracy of the movements of the racer 81, with reference to those of the rotor 84, a differential is used, the satellite pinions 91, 92, of which are secured to a holder 90 mechanically connected with the brush holder holding the movable brushes 88, 89. One of the pinions of the differential is controlled by the racer 81 through a pinion 94 connected mechanically as shown diagrammatically at 95 with the pinion 96 meshing with an auxiliary racer—97—keyed to the same shaft as the main racer 81. The other pinion 96 of the differential is controlled by the rotor of the receiver through the pinions 99, 100 mechanically connected through the transmission diagrammatically shown at 101.

The device works in the following manner: when there is no play in the transmission 86 connecting the rotor 84 with the racer 81, the reverse rotations of the two pinions 93 and 98 are equal and therefore the satellite holder 90 is not moved nor consequently the set of brushes 88, 89. The racer 81 is controlled accurately by the rotor 84 and its movements are in concordance with those transmitted to the receiver. On the contrary if any play arises in the transmission 85 or if it comprises a sliding part such as a friction clutch 102 (which for instance in the case of the controlled part being a gun, allows the racer 81 to be displaced by the firing without the rotor 84 being moved thereby) and the rotor and controlled part cease at a given moment to be in concordance the pinions 93 and 98 of the differential will rotate by a different amount and thereby the satellites will move together with the movable brushes 88, 89. This movement of the brushes feeding the induced stator of the receiving motor is used for making the rotor 84 continue its rotation by an amount such as will bring the racer 81 into the position corresponding exactly to the position given out by the distance control system.

The arrangement shown on Fig. 6 is executed electrically on Fig. 7 by means of a differential static transmitter the winding of which is similar to that of the transmitter shown on Fig. 3 and replacing the mechanical differential of Fig. 6. This arrangement comprises a magnetic core 105 round which is distributed a winding 106 the different elements of which are connected with a commutator 107. On this commutator rubs a first set of brushes 108, 109, 110 connected with the connecting wires 10, 11, 12, leading from the transmitter of the distant control system the receiver of which is the motor 80. This same commutator 107 bears also a second group of three brushes 111, 112, 113 connected with the three wires 114 leading to the brushes rubbing on the commutator of the rotor 84 of the receiver. The three brushes 108, 109, 110 are borne by the movable brush holder 115 controlled by the auxiliary racer 97. The three brushes 111, 112, 113 are borne by the movable brush holder 116 controlled by the rotor 84 of the receiver 80.

The working of this arrangement is easy to understand after the explanation given with reference to Fig. 6. If the positions of the rotor 84 and of the racer 81 remain in concordance the two sets of brushes rotate by an equal amount and the rotor 84 receives the impulses transmitted by its control device without the described arrangement interfering. On the contrary if there is a lack of concordance between 84 and 81 by reason of play in the transmission or of the working of the frictional clutch 102, the two sets of brushes will not remain at the same distance one from the other and the rotor 84 will rotate by a complementary amount corresponding to the shifting of the racer with reference to the rotor, which amount is provided such as will bring back the racer 81 exactly into the position corresponding to that transmitted by the distant control system. If it is necessary to allow the transmitted rotation to be corrected at the receiver, a differential shown diagrammatically at 117 can be inserted on the shaft connecting the rotor 84 with the movable brush holder 116 bearing the three brushes 111, 112, 113. One of the pinions is connected with the rotor 84 and the other with the movable brush-holder 116 whereas the planet pinions are controlled by the handwheel 118. Evidently when the rotor 84 is shifted with reference to the brushes 111, 112, 113 a corresponding correction will be brought to the position of the racer 81.

These correcting devices which comprise a mechanical differential (Fig. 6) or an electric differential (Fig. 7) provided with one single winding require a mechanical connection with the rotor 84 on one hand and the racer 81 on the other. If these parts are somewhat apart, this connection is difficult to provide and it may be of advantage to use an electric differential comprising two windings separated from each other and constituted by two distinct parts one of which is located near the receiver 84 and the other near the racer 81. This is equivalent to the use as an electric differential of two transmitters such as the one shown on Fig. 1 in series.

According to Fig. 8 which illustrates this arrangement, a first distributed winding 120 made round the core 121 is connected with the commutator 122 on which rub three brushes 123, 124, 125 borne by a movable brush holder 126 controlled by the auxiliary racer 97. These three brushes 123, 124, 125 are connected with the connecting wires 10, 11, 12, leading from the transmitter of the distant control system. Three equidistant terminals 127, 128, 129 of this winding 120 are connected through three wires with a second winding distributed round a magnetic core 131 and connected with a commutator 132 on which rub the brushes 133, 134, 135. These brushes are borne by a movable brush holder 136 actuated by the rotor 84 of the receiver 80. These three brushes 133, 134, 135 are connected through three wires 137 with three brushes, not shown, which feed the three windings of the rotor 84 of the receiver.

Like in Figs. 6 and 7 a differential 117 controlled by a handwheel 118 allows corrections to be brought to the position of the racer at the receiving station.

The working of this device is substantially the same as that of the device shown on Fig. 7. The rotation of the transmitter is transmitted through the wires 10, 11, 12 to the rotor 84 of the receiver 80 after passing through the windings 120 and 130. If the racer and the rotor are in concordance, the relative positions of the brushes 123, 124, 125 of the first winding 120 and of the brushes 133, 134, 135 of the second winding 130 does not change and no correction is made on the line feeding the rotor of the receiver 80. On the contrary if the racer 81 is shifted with reference to its position of concordance with the rotor, the two sets of brushes of the electric differential are shifted one with reference to the other and thereby a correction is made to the indications arriving at the rotor 84, which correction is such as will give the racer 81 the correct position corresponding to the indications of the transmitter.

In the case of the Figures 7 and 8, another correction can be added at the receiving station itself by providing a distributed inducing winding on the receiving motor the sections of which are connected with the segments of a commutator (see Fig. 8) fed with D. C. or A. C. (polyphase or one-phase) through brushes borne by a movable brushholder mechanically connected with a controlling part.

Fig. 9 shows diagrammatically a complete plant for transmission from a transmitter 150 to a racer 81. The transmitter provided with three brushes 151 is fed by the mains and controls the receiver 80, one component of which is fed by the mains, the other being fed by the brushes 151 of the transmitter by intermediate of the sets of the brushes 152 and 153, the first set 152 is connected to the brushes 151 of the transmitter, and actuated by the racer, the second set is connected to the second component of the receiver and actuated by the rotor, if desired, by intermediate of a differential 117 controlled by a hand wheel. Said two sets of brushes rubbing on commutators 122 and 132 connected to windings 120 and 130, wires 154 connecting together three equidistant points taken on said windings so as to transmit the potential of the first set of brushes to the second one in such manner that a shifting accidentally occurring between the transmitter and the racer may be corrected.

What I claim is:

1. In an electric distant control system comprising a transmitter fed by the mains and in which a set of three brushes rubs on a commutator in such a manner that said brushes are always connected with three equidistant points of the winding connected with said commutator, and a receiver one component of which is fed by the mains, the other component being fed at three equidistant points by intermediate of brushes in connection with the set of brushes of the transmitter: an arrangement adapted to bring a racer back in concordance with the receiver in case of accidental shifting between said racer and said receiver actuating it, this arrangement consisting in two movable sets of three brushes each, the first set being connected with the three brushes of the transmitter and actuated by the racer, the second set being connected with the three brushes of the receiver and actuated by its rotor, means to transmit the potential of the brushes of the first set to the brushes of the second one in such a manner that a shifting occurring between the potentials of these sets causes the receiver to rotate in order to correct the discordance.

2. In an electric distant control system comprising a transmitter fed by the mains and in which a set of three brushes rubs on a commutator in such a manner that said brushes are always connected with three equidistant points of the winding connected with said commutator, and a receiver one component of which is fed by the mains, the other component being fed at three equidistant points by intermediate of brushes in connection with the set of brushes of the transmitter: an arrangement adapted to bring a racer back in concordance with the receiver in case of accidental shifting between said racer and said receiver actuating it, this arrangement consisting in two movable sets of three brushes each, the first set being connected with the three brushes of the transmitter and actuated by the racer, the second set being connected with the three brushes of the receiver and actuated by its rotor, between the second set of brushes and the rotor of the receiver a mechanical device such as a differential controlled by handwheel allowing to give an extra shifting between said set of brushes and the rotor of the receiver, means to transmit the potential of the brushes of the first set to the brushes of the second one in such a manner that a shifting occurring between the potentials of these sets causes the receiver to rotate in order to correct the discordance.

3. In an electric distant control system comprising a transmitter fed by the mains and in which a set of three brushes rubs on a commutator in such a manner that said brushes are always connected with three equidistant points of the winding connected with said commutator, and a receiver one component of which is fed by the mains, the other component being fed at three equidistant points by intermediate of brushes in connection with the set of brushes of the transmitter; an arrangement adapted to bring a racer back in concordance with the receiver in case of accidental shifting between said racer and said receiver actuating it, this arrangement consisting in two movable sets of three brushes each, the first set being connected with the three brushes of the transmitter and actuated by the racer, the second set being connected with the three brushes of the receiver and actuated by its rotor; the first set of brushes rubs on a commutator connected with a winding, the second set rubs on a second commutator connected with a second winding, both windings being connected to each other by wires, having the length desired, connected on three equidistant points with each winding.

In testimony whereof I have affixed my signature.

ELIE GRANAT.